(12) United States Patent
Lee et al.

(10) Patent No.: US 9,392,804 B2
(45) Date of Patent: Jul. 19, 2016

(54) MULTI-PURPOSE CONSERVATION APPARATUS

(71) Applicant: Seoul Viosys Co., Ltd., Ansan-si (KR)

(72) Inventors: SeongMin Lee, Ansan-si (KR);
YoungHwan Son, Ansan-si (KR);
DaeWoong Suh, Ansan-si (KR)

(73) Assignee: SEOUL VIOSYS CO., LTD., Ansan-Si (KR)

( * ) Notice: Subject to any disclaimer, the term of this patent is extended or adjusted under 35 U.S.C. 154(b) by 0 days.

(21) Appl. No.: 14/397,325

(22) PCT Filed: Apr. 11, 2013

(86) PCT No.: PCT/KR2013/003016
§ 371 (c)(1),
(2) Date: Oct. 27, 2014

(87) PCT Pub. No.: WO2013/162192
PCT Pub. Date: Oct. 31, 2013

(65) Prior Publication Data
US 2015/0125355 A1 May 7, 2015

(30) Foreign Application Priority Data

Apr. 27, 2012 (KR) .......................... 10-2012-0044766

(51) Int. Cl.
*A23B 7/015* (2006.01)
*B65D 85/34* (2006.01)
(Continued)

(52) U.S. Cl.
CPC ................. *A23B 7/015* (2013.01); *A23B 7/144* (2013.01); *A23B 7/152* (2013.01); *A23L 3/26* (2013.01); *A23L 3/28* (2013.01); *B01D 53/007* (2013.01);
(Continued)

(58) Field of Classification Search
CPC ........ A23B 7/015; A23B 7/152; A23B 7/144; A23V 2002/00; B01D 53/14; B01D 2252/10; B01D 2255/802; B01D 53/007; B01D 35/00; B65D 8/28; B65D 81/2076; B65D 85/34; A23L 3/26; A23L 3/28; B01J 35/004; B01J 21/063; A61L 2/088; A61L 2/10; A61L 2202/122
See application file for complete search history.

(56) References Cited

U.S. PATENT DOCUMENTS

2005/0165499 A1* 7/2005 Stein ............................. 700/83
2006/0130498 A1* 6/2006 Joshi et al. ..................... 62/127
(Continued)

FOREIGN PATENT DOCUMENTS

JP 05-103588 * 4/1993
JP 2002204653 A 7/2002
(Continued)

OTHER PUBLICATIONS

English Translation of JP05-103588.*

*Primary Examiner* — Xiuyu Tai
(74) *Attorney, Agent, or Firm* — Perkins Coie LLP

(57) ABSTRACT

Provided is a multi-purpose conservation apparatus. The multi-purpose conservation apparatus includes a storage case, a light source module disposed in the storage case and configured to selectively remove a harmful gas in the storage case, and a control unit configured to control intensity of radiation of the light source module according to internal environmental data of the storage case. Accordingly, the intensity of radiation of the light source module can be adjusted according to the internal environmental data of the storage case, efficiently adjusting a level of photocatalysis.

19 Claims, 4 Drawing Sheets

(51) Int. Cl.

| | |
|---|---|
| *B65D 81/20* | (2006.01) |
| *B01J 35/00* | (2006.01) |
| *A23L 3/26* | (2006.01) |
| *A23L 3/28* | (2006.01) |
| *A23B 7/144* | (2006.01) |
| *A23B 7/152* | (2006.01) |
| *B01D 53/00* | (2006.01) |
| *B01D 53/14* | (2006.01) |
| *B65D 81/28* | (2006.01) |
| *B01J 21/06* | (2006.01) |

(52) U.S. Cl.
CPC ............... *B01D 53/14* (2013.01); *B01J 35/004* (2013.01); *B65D 81/2076* (2013.01); *B65D 81/28* (2013.01); *B65D 85/34* (2013.01); *A23V 2002/00* (2013.01); *B01D 2252/10* (2013.01); *B01D 2255/802* (2013.01); *B01J 21/063* (2013.01)

(56) References Cited

U.S. PATENT DOCUMENTS

| | | | |
|---|---|---|---|
| 2008/0066485 A1* | 3/2008 | Park et al. | 62/441 |
| 2008/0236183 A1* | 10/2008 | Iimura | 62/264 |
| 2010/0158749 A1* | 6/2010 | Benedek et al. | 422/4 |
| 2012/0070334 A1* | 3/2012 | Ehrhorn | 422/3 |

FOREIGN PATENT DOCUMENTS

| | | | |
|---|---|---|---|
| JP | 2003247773 A | | 9/2003 |
| JP | 2008-246355 | * | 10/2008 |
| JP | 2009027970 A | | 2/2009 |
| JP | 2009085521 A | | 4/2009 |
| KR | 1020040064933 A | | 7/2004 |
| KR | 1020050040259 A | | 5/2005 |

* cited by examiner

MULTI-PURPOSE CONSERVATION APPARATUS

CROSS REFERENCE TO RELATE APPLICATION

This patent document is a 35 U.S.C. §371 National Stage application of PCT Application No. PCT/KR2013/003016, filed on Apr. 11, 2013, which further claims the benefits and priority of prior Korean Patent Application No. 10-2012-0044766, filed on Apr. 27, 2012. The entire disclosures of the above applications are incorporated by reference in their entirety as part of this document.

TECHNICAL FIELD

The present invention relates to a multi-purpose conservation apparatus, and more particularly, to a multi-purpose conservation apparatus for controlling intensity of radiation of a light source module according to internal environmental data.

BACKGROUND ART

Ethylene gas is one of gases generated during ripening of vegetables and fruits, which reduces freshness. Apples, persimmons, mandarins, pears, and so on, among fruits, are known to generate a large amount of ethylene gas.

The ethylene gas is continuously generated during storage of the vegetables and fruits to excessively ripen and age the vegetables and fruits, degrading value of commodities of the vegetables and fruits.

For example, when fruits are stored in a sealed container, ethylene gas is continuously discharged. While there is no symptom on the exterior of the fruits for one to two weeks, the fruits are blackened after that.

In addition, when different kinds of fruits are stored together, the ethylene gas also wizens the different kinds of fruits. Accordingly, the fruits are recommended to be solely stored without sealing.

In order to solve the problem, the ethylene gas generated in the sealed space can be absorbed using an absorbent such as fibrous activated carbon or the like. However, since the method using the absorbent is restricted by an absorption capacity an the ethylene gas is discharged again when the capacity arrives at its limit, a periodic exchange of the absorbent is needed.

In addition, as the ethylene is decomposed and removed using an ultraviolet light mercury lamp and a structure coated with a photocatalyst, freshness of fruits and vegetables could be maintained. Korean Patent Application Laid-Open No. 10-2004-0064933, filed on Jul. 21, 2004, discloses a freshness maintaining apparatus for fruits, vegetables, and flowers, in which a photocatalyst is installed. However, an ultraviolet light mercury lamp is driven regardless of a height or weight of the stored fruits and vegetables or flowers, and thus, energy consumption becomes inefficient.

DISCLOSURE OF INVENTION

Technical Problem

In order to solve the foregoing and/or other problems, a photocatalyst is used with a light emitting diode, and the intensity of radiation is adjusted according to internal environmental data, inducing effective photocatalysis.

Solution to Problem

The foregoing and/or other aspects of the present invention may be achieved by providing a multi-purpose conservation apparatus including: a storage case; a light source module disposed in the storage case and configured to selectively remove a harmful gas in the storage case; and a control unit configured to control intensity of radiation of the light source module according to internal environmental data of the storage case.

The light source module may include a photocatalyst layer and at least one light emitting diode configured to radiate light to the photocatalyst layer.

Advantageous Effects of Invention

According to the present invention, the intensity of radiation of the light source module can be adjusted according to internal environmental data in the conservation apparatus to efficiently adjust a level of photocatalysis.

Aspects of the present invention should not be limited by the above description, and other unmentioned aspects will be clearly understood by one of ordinary skill in the art from exemplary embodiments described herein.

MODE FOR THE INVENTION

Hereinafter, reference will now be made in detail to the embodiments of the present invention, examples of which are illustrated in the accompanying drawings. However, it will be apparent to those skilled in the art that the following embodiments can be readily understood and modified into various types, and the scope of the present invention is not limited to the embodiments.

When a layer is described as being formed on another layer or substrate, the layer may be formed directly on the other layer or substrate, or a third layer may be interposed between them. In addition, in the description, directional expressions such as an upper side, an upper portion, an upper surface, and so on, can be understood to include a lower side, a lower portion, a lower surface, and so on. That is, spatial direction expressions should be understood as relative directions, other than a limited direction, which refers an absolute direction.

In the embodiment, it will be understood that, although the terms "first", "second", "third", or the like, may be used herein to discriminate various elements, these elements should not be limited by these terms.

In addition, in the description and drawings, the thickness of layers and regions are exaggerated for clarity. Like numerals refer to like elements throughout the description of the drawings.

First Embodiment

Figure 1:
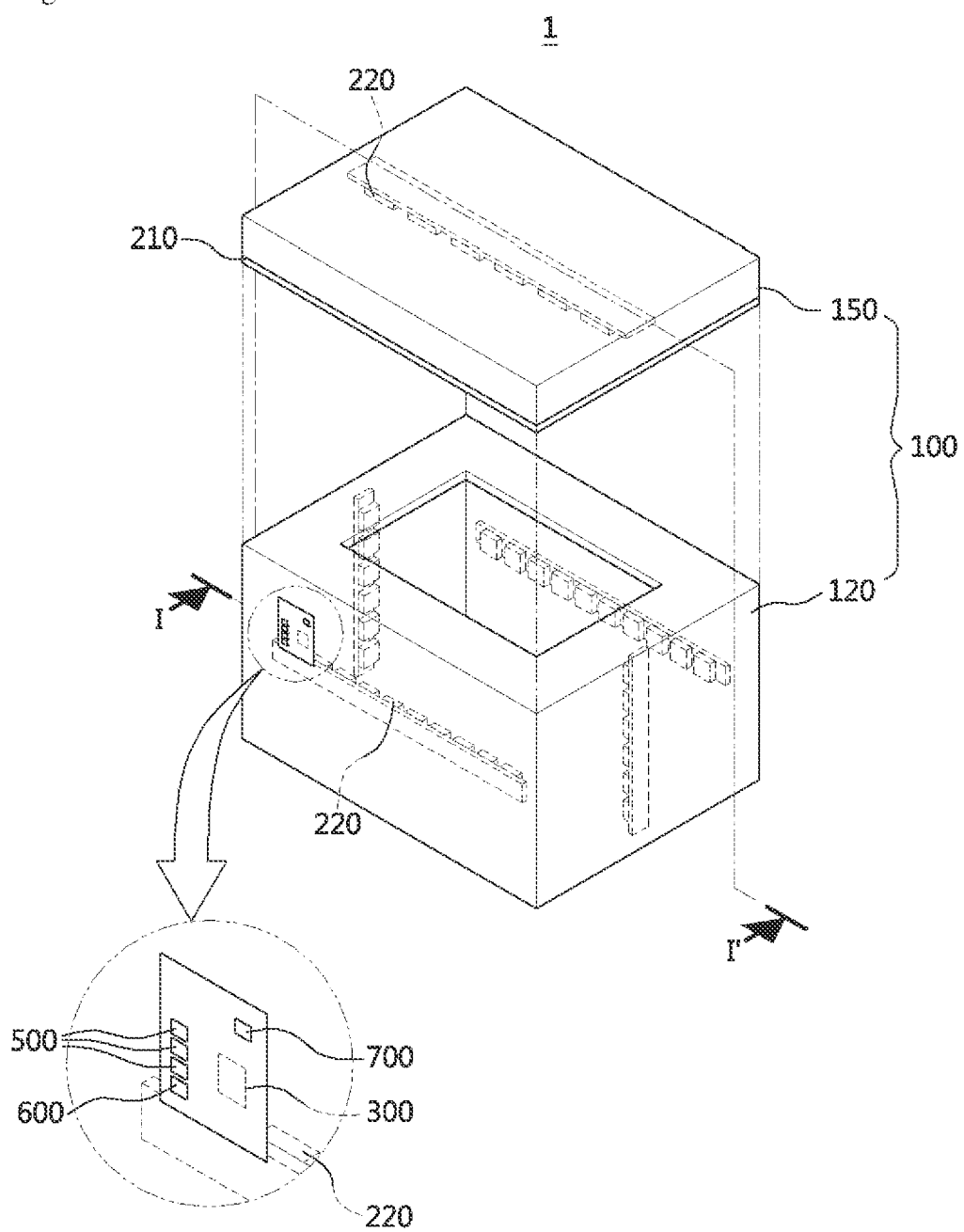
FIG. 1 is a perspective view showing a multi-purpose conservation apparatus according to an embodiment of the present invention.
Figure 2:
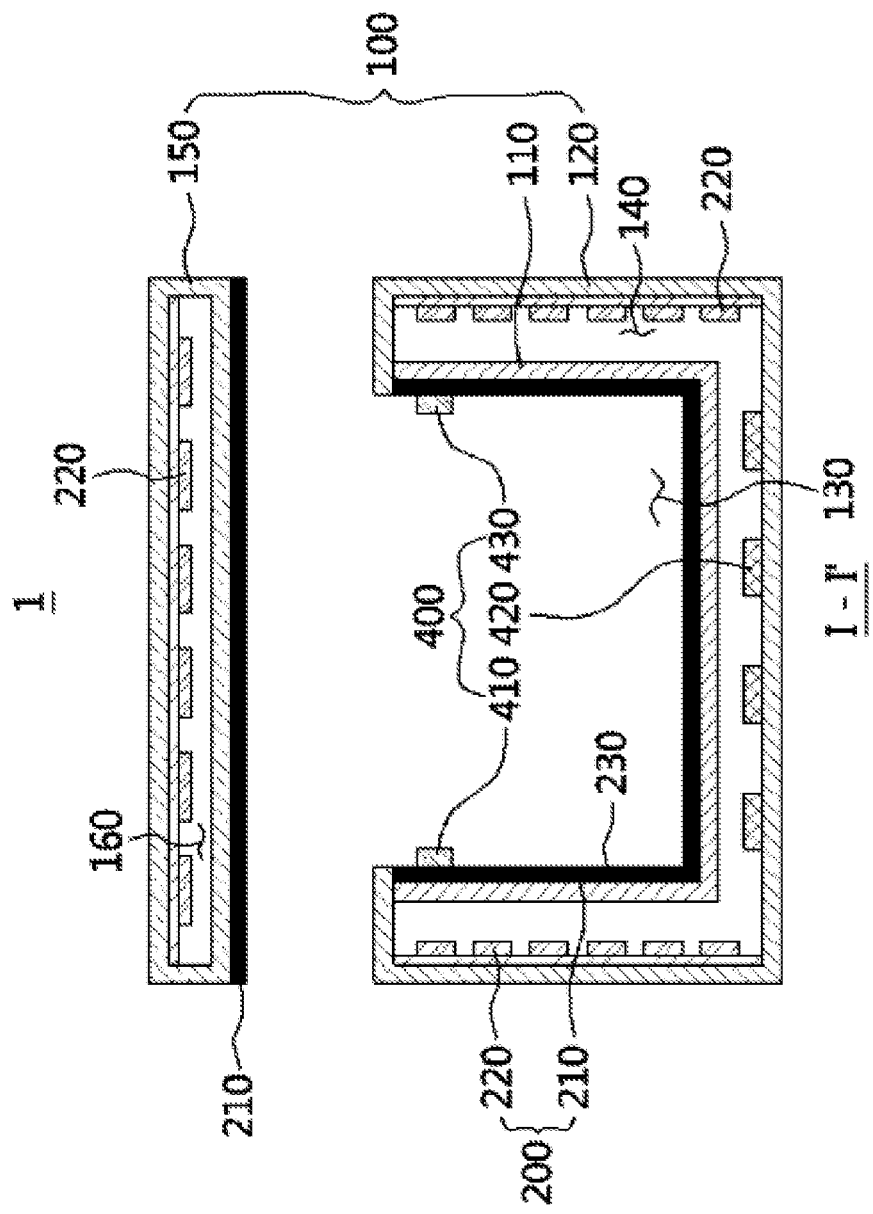
FIG. 2 is a cross-sectional view taken along line I-I' of FIG. 1.

FIG. 1 is a perspective view showing a multi-purpose conservation apparatus 1 according to a first embodiment of the present invention. FIG. 2 is a cross-sectional view taken along line I-I' of FIG. 1.

Referring to FIGS. 1 and 2, the multi-purpose conservation apparatus 1 includes a storage case 100, a light source module 200 and a control unit 300.

The storage case 100 may include an inner case 110, an outer case 120, and a cover unit 150.

The inner case 110 may have an accommodating unit 130 formed therein, at least one surface of which may be open. Accordingly, articles can be stored in the accommodating unit 130 of the inner case 110. The article may be a solid product or a fluid product. The solid article may be fruits and/or vegetables, and the fluid article may be water. The inner case 110 may be formed of a material through which light from the light source module 200 can pass.

The outer case 120 is spaced apart from an outer circumferential surface of the inner case 110 and surrounds the outer circumferential surface. A space section 140 is formed between the inner case 110 and the outer case 120. However, portions of the outer case 120 and the inner case 110 can be connected to each other. The outer case 120 may be formed of various materials such as a plastic material or the like.

The storage case 100 may have a box shape or a pipe shape.

Meanwhile, the storage case 100 may further include a support frame (not shown) configured to help maintain a space between the inner case 110 and the outer case 120.

The cover unit 150 may be connected to the accommodating unit 130 and may include a space section 160 formed therein. Accordingly, when the cover unit 150 is coupled to the accommodating unit 130, the inside of the storage case 100 can be hermetically sealed. The cover unit 150 may be formed of various materials such as a plastic material or the like. However, one surface of the cover unit 150 opposite to the accommodating unit 130 may be formed of a material through which light from the light source module 200 (to be described later) can pass.

The light source module 200 may be disposed in the storage case 100 to selectively remove a harmful gas in the storage case 100.

The harmful gas may be a gas generated from the article stored in the storage case 100. For example, the harmful gas may include a gas generated from fruits and vegetables. The harmful gas may include ethylene gas.

The light source module 200 may include a photocatalyst layer 210 and at least one light emitting diode 220 configured to radiate light to the photocatalyst layer 210.

The light emitting diode 220 may be disposed in at least one of a space between the inner case 110 and the outer case 120, and the space section 160 of the cover unit 150.

The light emitting diode 220 functions to convert an electrical signal of power or the like provided from the outside into light. One or a plurality of light emitting diodes 220 may be provided. The number of light emitting diodes 220 may be adjusted according to a size or use of the storage case 100. In addition, the light emitting diodes 220 may be arranged in a pattern to evenly irradiate a surface of the photocatalyst layer 210 (to be described below). Accordingly, as the surface of the photocatalyst layer 210 is uniformly irradiated, a surface area of the activated photocatalyst layer 210 is also increased, improving photocatalysis efficiency.

The light emitting diode 220 may include a light emitting diode configured to radiate light having a wavelength of 200 nm to 400 nm, which functions to provide a light source configured to activate the photocatalyst. If the wavelength of the light emitting diode 220 is larger than 400 nm, since light has energy smaller than bandgap energy of the photocatalyst itself is generated, the photocatalyst cannot be activated. In addition, when the wavelength of the light emitting diode 220 is smaller than 200 nm, energy efficiency for activation of the photocatalyst may be decreased. For example, the light emitting diode 220 may be a near ultraviolet light (NUV) light emitting diode or a deep ultraviolet light (DUV) light emitting diode.

The photocatalyst layer 210 may be coated on at least one of an inner circumferential surface of the inner case 110 and one surface of the cover unit 150 opposite to the accommodating unit 130. However, when the inner case 110 and the cover unit 150 are formed of a photocatalyst material, the photocatalyst layer 210 may be omitted.

The photocatalyst layer 210 may be formed of any material as long as the material can function as a photocatalyst. For example, the photocatalyst layer 210 may include any one selected from the group consisting of $TiO_2$, $SiO_2$, $WO_3$, ZnO, and a mixture thereof. For example, the photocatalyst layer 210 may include $TiO_2$.

When the photocatalyst layer 210 is activated, a harmful gas, for example, ethylene gas can be removed. This is performed by using a photolysis reaction of the photocatalyst. When light having energy larger than the bandgap energy of the photocatalyst itself is radiated to the photocatalyst layer 210, an electron is generated from the surface of the photocatalyst. The generated electron reacts with a hydrogen molecule contained in moisture to generate a hydroxyl radical (OH-radical). Here, the generated hydroxyl radical reacts with another gas in a very instable state, and in particular, has a function of decomposing an organic material with excellent oxidizing power. Accordingly, the photocatalyst can be activated to decompose and remove the ethylene gas. For example, when the TiO2 photocatalyst is activated, the ethylene gas can be removed through photo-oxidation decomposition under an atmosphere of moisture in the air according to the following [Chemical Formula 1].

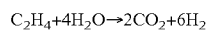

$$C_2H_4+4H_2O \rightarrow 2CO_2+6H_2 \qquad \text{[Chemical Formula 1]}$$

A thickness of the photocatalyst layer 210 may be 10 μm to 30 μm. If the thickness of the photocatalyst layer 210 is less than 10 μm, the ethylene gas cannot be sufficiently removed and durability of the photocatalyst layer 210 may be insufficient. In addition, when the thickness of the photocatalyst layer 210 is more than 30 μm, since the thickness of photocatalyst layer is increased while an area in contact with the ethylene gas is constant, economic feasibility may be reduced.

Accordingly, when the entire inner surface of the inner case 110 is coated with the photocatalyst layer 210, since a reaction area with the ethylene gas is maximized, photocatalysis efficiency can be improved.

An absorbent 230 may be further provided on the photocatalyst layer 210. The absorbent 230 may include activated carbon, supported metal activated carbon, potassium permanganate (KMnO4), Zeolite, or the like. Accordingly, a bad smell or the like generated from the stored articles can be removed through the absorbent 230.

The control unit 300 may include a microcomputer. The control unit 300 can control the intensity of radiation of the light source module 200 according to the internal environmental data.

The internal environmental data may include at least one of an amount of stored articles, opening/closing of the storage case 100, and a generation amount of a harmful gas. For example, the amount of stored articles may be an amount of fruits and vegetables stored in the storage case 100.

For example, the control unit 300 can control a lighting quantity and on/off switching time of the light source module 200 according to a predetermined reference lighting quantity and on/off switching time corresponding to the internal environmental data.

The reference lighting quantity and on/off switching time may be previously set to be appropriate to predict a harmful gas amount generated from the stored articles and remove the harmful gas based on a height, a weight, a flow rate, or the like, of the stored articles. In addition, the harmful gas amount to be removed may be set to each unit section, and the number of light emitting diodes and lighting hours needed to remove the harmful gas corresponding to the unit section can be previously set.

Information on the predetermined set of reference lighting quantity and on/off switching time may be stored in a storage unit (not shown). The storage unit may include a memory.

The multi-purpose conservation apparatus 1 may further include a sensor unit 400 configured to collect the internal environmental data.

The sensor unit 400 may be disposed in the storage case 100 and collect the internal environmental data of the storage case 100.

The sensor unit 400 may include any one selected from the group consisting of a height sensor 410, a pressure sensor 420, a gas sensor 430, and a flow rate sensor (not shown). The gas sensor 430 may be a gas sensor configured to measure a harmful gas amount. Accordingly, the internal environmental data collected by the sensor unit may be data related to a height, a weight, a harmful gas amount, or a flow rate of the stored articles.

The height sensor 410, the gas sensor 430, or the flow rate sensor may be formed on an inner surface of the inner case 110, and the pressure sensor 420 may be formed between a lower surface of the inner case 110 and a lower surface of the outer case 120.

The multi-purpose conservation apparatus 1 may further include a display unit 500 configured to display data received from the control unit 300.

The display unit 500 may be a liquid crystal display (LCD), a plasma display panel (PDP), a light emitting diode (LED), a laser diode, or a touch screen. However, the display unit 500 may be omitted according to the embodiment.

The display unit 500 may include an internal environment display unit or a radiation intensity display unit. The internal environment display unit may include a height display unit, a weight display unit, a flow rate display unit, or a gas amount display unit. The radiation intensity display unit may include a light source lighting display unit or an on/off switching time display unit. For example, when the sensor unit 400 includes the height sensor, the pressure sensor, and the gas sensor, the display unit 500 may include the height display unit, the weight display, unit and the gas display unit. In addition, the display unit 500 may further include the light source lighting display unit or the on/off switching time display unit.

The control unit 300 and the display unit 500 may be mounted on the storage case 100, or may be separately provided from the storage case 100. Accordingly, when the control unit 300 and the display unit 500 are separately provided from the storage case 100, they can be connected to each other through a wired or wireless communication network 350 in a wired or wireless manner. In this case, the internal environmental data in the storage case 100 can be remotely monitored, or the light source module mounted in the storage case can be remotely controlled.

The multi-purpose conservation apparatus 1 may further include a timer 600. The timer 600 is controlled by the control unit 300. Of course, the timer 600 can be manually adjusted to adjust an on/off switching time of the light source module 200.

The multi-purpose conservation apparatus 1 may further include an ON/OFF switch 700. The ON/OFF switch 700 functions to supply and cut off the power to the multi-purpose conservation apparatus 1.

Meanwhile, the multi-purpose conservation apparatus 1 may include a power supply unit (not shown). For example, when the multi-purpose conservation apparatus 1 has a small box shape, the power supply unit may include a mercury battery.

Accordingly, the multi-purpose conservation apparatus 1 of the present invention can adjust the intensity of radiation of the light source module 200 according to the internal environmental data of the storage case 100, efficiently adjusting a level of the photocatalysis.

Second Embodiment

A multi-purpose conservation apparatus 1' according to an embodiment of the present invention is provided.

Figure 3:
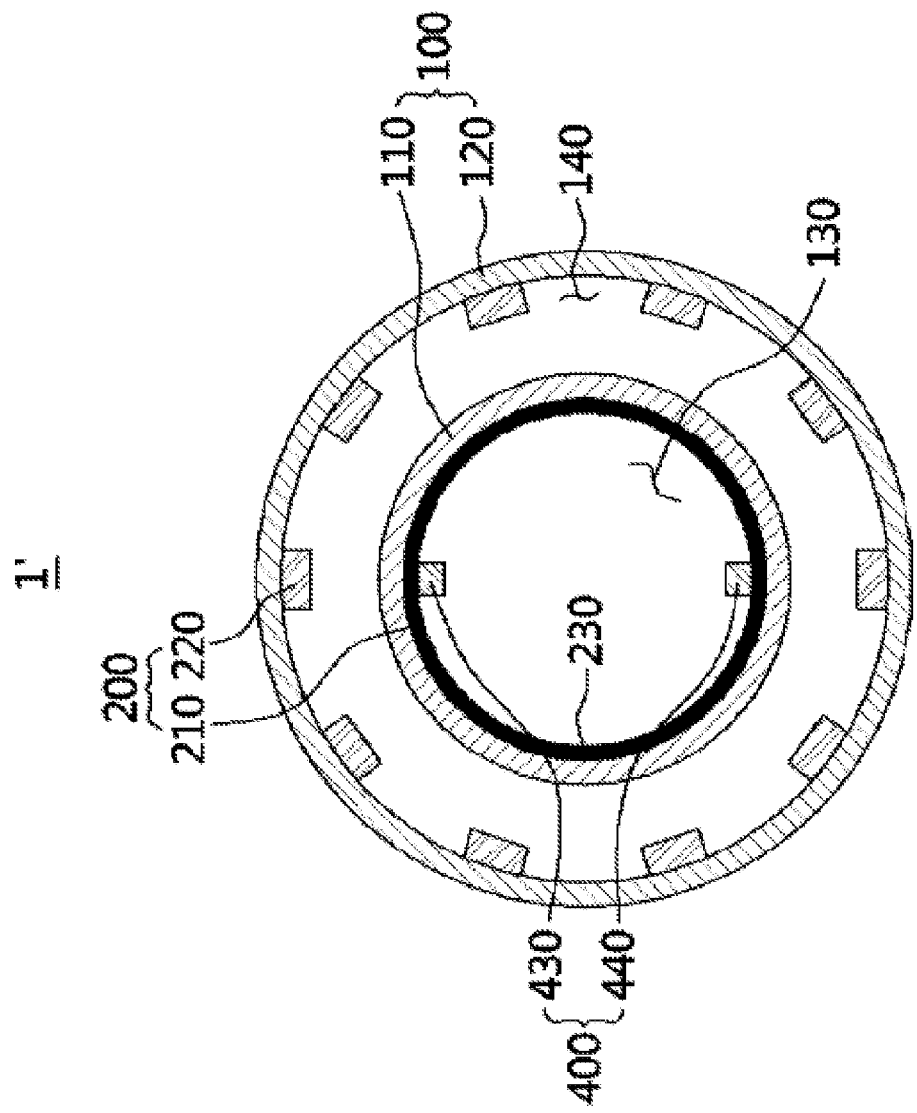
FIG. 3 is a cross-sectional view showing the multi-purpose conservation apparatus according to the embodiment of the present invention.

FIG. 3 is a cross-sectional view showing the multi-purpose conservation apparatus 1' according to the embodiment of the present invention. Referring to FIG. 3, the multi-purpose conservation apparatus 1' may include a storage case 100, a light source module 200, and a control unit (not shown).

The storage case 100 includes an inner case 110 and an outer case 120. The inner case 110 has an accommodating unit 130 formed therein, at least one surface of which is open. The outer case 120 is spaced apart from an outer circumferential surface of the inner case 110 to surround the outer circumferential surface. Accordingly, a space section 140 is formed between the inner case 110 and the outer case 120. Portions of the outer case 120 and the inner case 110 may be connected to each other. In addition, a support frame (not shown) configured to support the outer case 120 and the inner case 110 may be further provided.

Accordingly, the accommodating unit 130, at least one surface of which is open, is formed in the storage case 100. For example, the storage case 100 may have a pipe shape, both surfaces of which are open.

Here, in some cases, the storage case 100 may further include a cover unit (not shown).

The light source module 200 may be disposed in the storage case 100 to selectively remove a harmful gas in the storage case 100.

The light source module 200 may include a photocatalyst layer 210 and at least one light emitting diode 220 configured to radiate light to the photocatalyst layer 210.

The light emitting diode 220 may be disposed between the inner case 110 and the outer case 120 to radiate light to the photocatalyst layer 210. One or a plurality of light emitting diodes 220 may be provided. The number of light emitting diodes 220 may be adjusted according to the size of the storage case 100. In addition, the light emitting diodes 220 may be arranged in a pattern.

The photocatalyst layer 210 may be formed of any material as long as the material can function as the photocatalyst. For example, the photocatalyst layer 210 may include any one selected from the group consisting of $TiO_2$, $SiO_2$, $WO_3$, $ZnO$, and a mixture thereof. For example, the photocatalyst layer 210 may include $TiO_2$.

An absorbent (not shown) may be further provided on the photocatalyst layer 210. The absorbent may include activated carbon, supported metal activated carbon, potassium permanganate ($KMnO_4$), Zeolite, or the like. Accordingly, a bad smell or the like generated from the articles can be removed through the absorbent.

The control unit may further include a microcomputer. The control unit can control the intensity of radiation of the light source module according to the internal environmental data.

For example, the control unit 300 can control a lighting quantity and on/off switching time of the light source module 200 according to a predetermined reference lighting quantity and on/off switching time corresponding to the internal environmental data.

The multi-purpose conservation apparatus 1 may further include a sensor unit 400 configured to collect the internal environmental data. The sensor unit 400 is disposed in the storage case 100 and can collect the internal environmental data of the storage case 100. The sensor unit 400 may include a gas sensor 430 or a flow rate sensor 440. The gas sensor 430 may be a gas sensor configured to measure a harmful gas amount. Accordingly, the internal environmental data collected by the sensor unit may be a gas amount or a flow rate data of the stored articles. The gas sensor 430 or the flow rate sensor 440 may be formed on an inner surface of the inner case 110.

The multi-purpose conservation apparatus 1 may further include a display unit (not shown).

The control unit or the display unit may be mounted on the storage case 100 or may be separately provided from the storage case 100. Accordingly, when the control unit or display unit is separately provided from the storage case, they can be connected through a wired or wireless communication network (not shown) in a wired or wireless manner. In this case, information on the articles stored in the storage case 100 can be remotely monitored, or the light source module mounted in the storage case 100 can be remotely controlled.

Accordingly, when the multi-purpose conservation apparatus 1' of the present invention is used as a portion of a water treatment circulation system, water quality can be improved through the photocatalyst layer or the absorbent. In addition, the intensity of radiation, for example, the lighting quantity and on/off switching time, of the light source module may be adjusted according to the flow rate or harmful gas amount of the stored fluid to efficiently adjust a level of the photocatalysis.

Third Embodiment

A harmful gas control method according to an embodiment of the present invention will be described.

Figure 4:
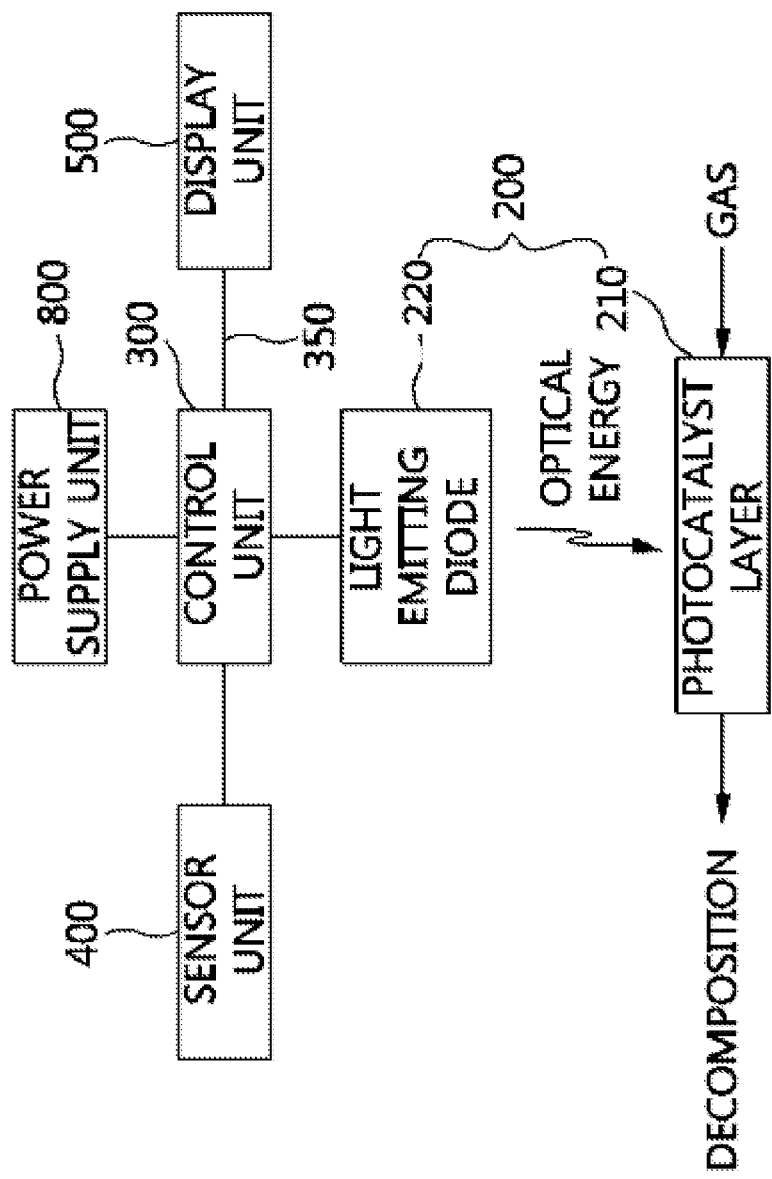
FIG. 4 is a control block diagram of the multi-purpose conservation apparatus according to the embodiment of the present invention.

FIG. 4 is a control block diagram of a multi-purpose conservation apparatus according to the embodiment of the present invention. Referring to FIG. 4, articles can be stored in the multi-purpose conservation apparatuses 1 and 1 described with reference to FIGS. 1, 2, and 3. The articles may be solid articles or fluids. The solid articles may be fruits and/or vegetables, and the fluids may be water.

For example, fruits can be inserted into the accommodating unit 130 (see FIGS. 1 and 2) of the storage case 100 (see FIGS. 1 and 2), and the cover unit 150 (see FIGS. 1 and 2) is coupled thereto so that the fruits can be hermetically stored. For another example, the fluid can be inserted into the storage case 100 (see FIG. 3), fixed or circulated, and stored in the apparatus.

A power supply unit 800 can supply power to the multi-purpose conservation apparatus.

The internal environmental data can be collected by the sensor unit 400. For example, height and weight data of the filled solid articles can be collected by the height sensor and the pressure sensor, respectively. For another example, the harmful gas amount and the flow rate data generated from the fluid can be collected by the gas sensor and the flow rate sensor.

The control unit 300 can control the intensity of radiation of the light source module 200 according to the internal environmental data. For example, the control unit 200 controls the intensity of radiation of the light source module 200 according to a predetermined reference lighting quantity and on/off switching time corresponding to the internal environmental data collected by the sensor unit 400.

The collected information is displayed by the display unit 500 from the control unit 300.

The light emitting diode 220 is driven based on the control. For example, the plurality of light emitting diodes 220 can be driven based on the control.

The photocatalyst layer 210 can be activated by the light emitted from the light emitting diode 220 to decompose and remove the harmful gas generated from the stored articles.

Accordingly, when the foods such as fruits, vegetables, or the like, are stored, the foods can be stored while maintaining the freshness of the foods through removal of the harmful gas.

In addition, when the fluid such as water or the like is stored, the fluid can be stored while improving quality of the fluid through removal of the harmful gas. Further, when the fluid is circulated in the conservation apparatus, since the amount of harmful gas in contact with the photocatalyst layer 210 activated by the light emitting diode 220 is increased, efficiency of photocatalysis can be improved.

The foregoing description concerns an exemplary embodiment of the invention, is intended to be illustrative, and should not be construed as limiting the invention. The present teachings can be readily applied to other types of devices and apparatuses. Many alternatives, modifications, and variations within the scope and spirit of the present invention will be apparent to those skilled in the art.

DESCRIPTION OF REFERENCE NUMERALS 1, 1: multi-purpose conservation apparatus
100: storage case
110: inner case
120: outer case
130: accommodating unit
140: space section
150: cover unit
160: space section
200: light source module
210: photocatalyst layer
220: light emitting diode
300: control unit
400: sensor unit
410: height sensor
420: pressure sensor
430: gas sensor
440: flow rate sensor
500: display unit
600: timer
700: ON/OFF switch
800: power supply unit

The invention claimed is:

1. A multi-purpose conservation apparatus comprising:
a storage case comprising an inner case having an accommodating unit formed in the inner case and including an open surface, and an outer case spaced apart from an outer circumferential surface of the inner case and surrounding the outer circumferential surface of the inner case;
a light source module disposed in the storage case and comprising a photocatalyst layer and configured to selectively remove a gas harmful to an article stored in the storage case and at least one light emitting diode configured to radiate light to a surface of the photocatalyst layer to activate the photocatalyst layer; and a control unit communicatively linked with the light source module and configured to control intensity of radiation of the light source module based at least partly on internal environmental data of the storage case, wherein the light emitting diode is disposed in a space section between the inner case and the outer case, the photocatalyst layer is coated on at least one of an inner circumferential surface of the inner case, the inner case includes a material that allows light from the light emitting diode to pass through the inner case, and the accommodating unit and the space section are separated by the inner case so that the accommodating unit stores a product including a fluid.

2. The multi-purpose conservation apparatus according to claim 1, wherein the storage case further comprises:
a cover unit coupled to the accommodating unit and having a space inside of the cover unit.

3. The multi-purpose conservation apparatus according to claim 2, wherein the light emitting diode is disposed in the space of the cover unit, and
the photocatalyst layer is coated on one surface of the cover unit facing to the accommodating unit.

4. The multi-purpose conservation apparatus according to claim 1, wherein the light emitting diode radiates light having a wavelength of 200 nm to 400 nm.

5. The multi-purpose conservation apparatus according to claim 1, wherein the article includes fruits or vegetables, and the gas harmful to the fruits or vegetables is generated from fruits or vegetables.

6. The multi-purpose conservation apparatus according to claim 5, wherein the gas harmful to the fruits or vegetables comprises ethylene gas.

7. The multi-purpose conservation apparatus according to claim 1, wherein the internal environmental data comprises at least one of information on an amount of fruits or vegetables, information on opening or closing of the storage case, or information an amount of the gas harmful to the article.

8. The multi-purpose conservation apparatus according to claim 1, further comprising a display unit configured to display data received from the control unit.

9. The multi-purpose conservation apparatus according to claim 1, wherein the light source module includes two or more light emitting diodes arranged in a pattern to evenly irradiate the surface of the photocatalyst layer to activate the photocatalyst layer.

10. The multi-purpose conservation apparatus according to claim 1, wherein, in addition to the at least one light emitting diode, the light source module further includes additional light emitting diodes arranged along with the at least one light emitting diode in a pattern, wherein the additional light emitting diodes and the at least one light emitting diode in the pattern are configured to radiate light on the surface of the photocatalyst layer to activate the photocatalyst layer and decompose the gas harmful to the article.

11. The multi-purpose conservation apparatus according to claim 1, wherein a thickness of the photocatalyst layer is 10 μm to 30 μm.

12. The multi-purpose conservation apparatus according to claim 1, wherein the photocatalyst layer is coated on entire inner circumferential surface of the inner case.

13. The multi-purpose conservation apparatus according to claim 1, comprising:
an absorbent disposed on the photocatalyst layer to absorb a smell causing material.

14. The multi-purpose conservation apparatus according to claim 13, wherein the absorbent includes activated carbon, supported metal activated carbon, potassium permanganate ($KMnO_4$), or Zeolite.

15. The multi-purpose conservation apparatus according to claim 1, wherein the internal environmental data comprises information on a lighting quantity or on/off switching time of the light source module.

16. The multi-purpose conservation apparatus according to claim 1, comprising:
at least one sensor unit disposed in the storage case.

17. The multi-purpose conservation apparatus according to claim 16, wherein the sensor unit includes a gas sensor or a flow rate sensor to measure an amount of the gas harmful to the article.

18. The multi-purpose conservation apparatus according to claim 1, wherein the control unit is physically separated from the storage case and is communicatively linked with the storage case using a wireless communication medium.

19. The multi-purpose conservation apparatus according to claim 16, wherein the at least one sensor unit includes a height sensor and a pressure sensor to monitor a height and weight of the article stored in the storage case.

* * * * *